March 14, 1967 A. M. MAROTH 3,308,674
RADIAL ROLLER ANTI-FRICTION TRANSMISSION
Filed Jan. 27, 1965 2 Sheets-Sheet 1
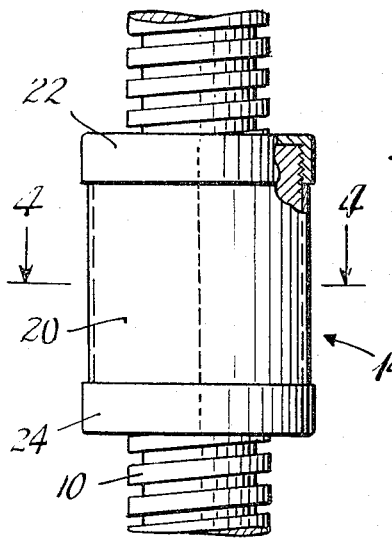
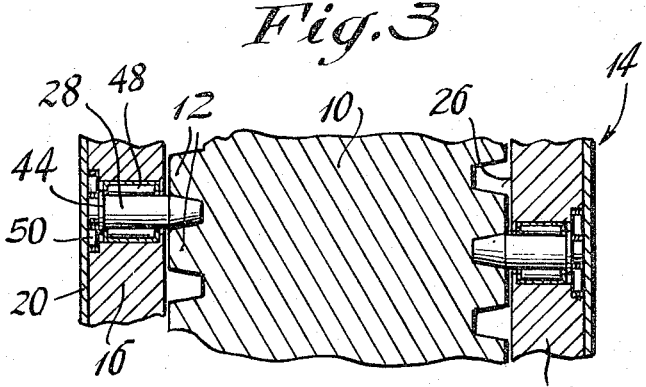
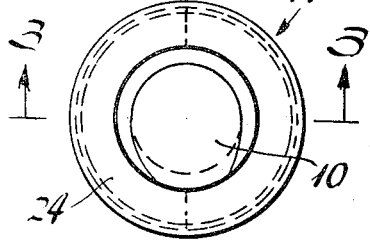
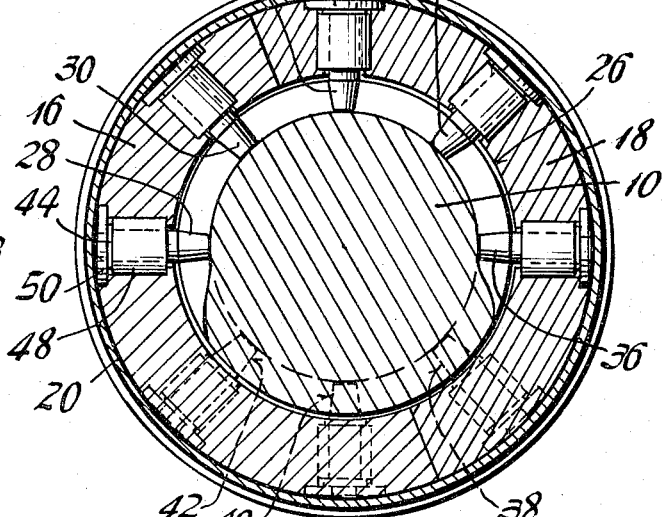
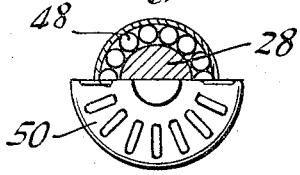
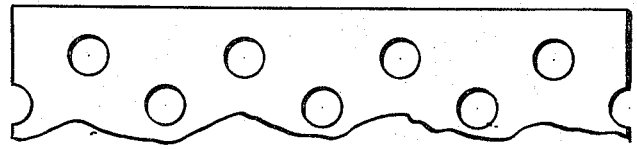
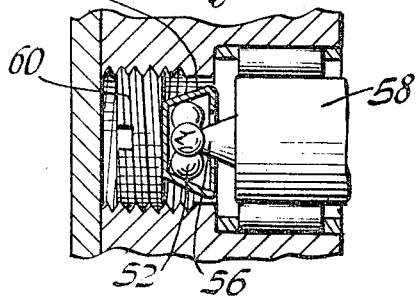
INVENTOR.
Arthur M. Maroth
BY
AGENT

United States Patent Office 3,308,674
Patented Mar. 14, 1967

3,308,674
RADIAL ROLLER ANTI-FRICTION
TRANSMISSION
Arthur M. Maroth, Grumman Hill Road,
Wilton, Conn. 06897
Filed Jan. 27, 1965, Ser. No. 428,305
6 Claims. (Cl. 74—424.8)

This invention relates to mechanical transmissions, and more particularly to devices of this type which employ shouldered or threaded members.

Heretofore small drives in the form of recirculating ball screws have found widespread use where relatively light loads are involved, especially in conjunction with moderate working strokes. Such recirculating screw devices however require especially clean operating conditions, as well as very accurate fabrication of the parts. Also, by virtue of their very nature (utilizing balls) they are not adapted to handle heavy loads. Accordingly, limitations exist, with respect to such recirculating ball screws, which cannot be overcome by design refinements.

The present invention obviates the disadvantages of recirculating ball screws as above noted, and accordingly one object of the invention is to provide a novel and improved antifriction, high efficiency transmission device of the type involving screw threaded or toothed members such as screws, gears and the like, which will effectively handle loads from light and moderately heavy, up to very heavy loads without danger of failure.

Another object of the invention is to provide an improved high efficiency, low friction transmission as above set forth, which has relatively few parts or components, and which may be constructed in a simple manner.

Yet another object of the invention is to provide an improved anti-friction transmission as above outlined, which may be economically fabricated and readily produced at relatively low cost.

A feature of the invention resides in the provision of an anti-friction transmission as above characterized, which is relatively small in size and compact, and is especially flexible in its adaptability to various power requirements.

Another feature of the invention resides in the provision of a high efficiency low friction transmission of the kind outlined, wherein the load capacity may be increased in a simple manner, by merely increasing the number of load bearing elements of one of two cooperable members.

Other features and advantages will hereinafter appear.

In the drawings accompanying this specification, similar characters of reference are used to designate like components throughout the several views, in which:

FIG. 1 is a side elevational view of the present improved anti-friction transmission, illustrating one embodiment of the invention.

FIG. 2 is a top plan view of the transmission of FIG. 1.

FIG. 3 is an axial section taken on the line 3—3 of FIG. 2.

FIG. 4 is a transverse section taken on the line 4—4 of FIG. 1.

FIG. 5 is a diagram showing a developed flat plane surface of one of the transmission parts, and indicating the location of anti-friction load bearing elements carried by such parts.

FIG. 6 is a fragmentary sectional view, taken on the line 6—6 of FIG. 3.

FIG. 7 is a detail, enlarged, showing a modification of the invention, involving another form of anti-friction thrust bearing for use with the load bearing elements of the transmission and showing means for radially adjusting a roller element.

Figure 8:
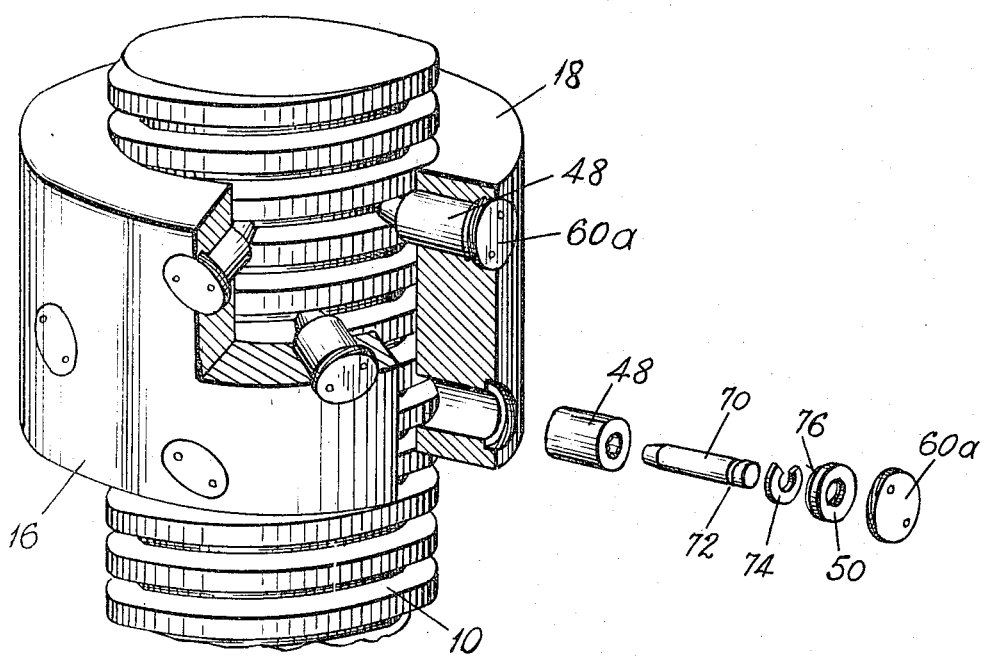
FIG. 8 is a perspective, exploded and broken away view of a transmission as provided by the invention, illustrating a slight modification thereof.

Referring now particularly to the drawings, there is shown a screw 10 which, as seen in FIG. 3, has an Acme or substantially square helical thread 12 provided on it. Hereinafter the screw 10, especially in the appended claims, is referred to as a shouldered part, the thread 12 being considered as providing projections or shoulders on said part. As will be explained later, the part 10 for certain embodiments of the invention could be in the form of a spur or spiral gear or the like, this also being considered as a shouldered part with the teeth constituting the projections thereof.

Cooperable with the screw 10, in the embodiment illustrated, is an anti-friction nut part or assemblage designated generally by the numeral 14. The nut part or assemblage 14 is here shown as being in the form of a split member, made up of two halves 16 and 18. However, it will be understood that the nut part 14 may be constituted as a single piece just as well, or may be made up of more than two parts.

In the case of the two nut halves 16, 18 a retainer sleeve 20 is provided, encircling and engaging the outer peripheral portions of the nut halves, and end caps 22 and 24 are provided, threaded on the nut halves 16, 18 and abutting the ends of the retainer sleeve 20. The caps 22, 24 and sleeve 20 illustrate one way of securing together a multiple part nut assemblage, and it will be understood that the means illustrated has advantages since but little extra space is required, since it is especially compact, and since the nut halves will be rigidly secured against relative movement and instead maintained in a precise relationship one to the other.

The nut assemblage 14 has an inner periphery 26 which is sufficiently large in diameter to somewhat loosely receive the screw 10.

In accordance with the present invention, the nut part 14 (hereinafter also referred to as a "support member") is provided with a plurality (here shown as 8 in number) of roller elements 28, 30, 32, 34, 36, 38, 40 and 42 which are disposed in sockets of the annulus, being carried by and projecting inward from the member 14 and protruding from the inner periphery 26 thereof. The roller elements 28-42 are arranged for engagement and line contact with side surfaces of the projections or screw thread portions 12 of the screw part 10, to coact therewith in the nature of a screw thread. The elements 28-42 are shown as in the form of pins having slightly tapered projecting portions arranged to fit the taper of the screw thread 12, and having head portions (such as the head 44 of the pin 28) located at the outer periphery of the annulus of nut assemblage 14, said head portions preventing inward movement of the pins from the sockets.

The sockets for the roller elements or pins 28-42 are substantially radially disposed in the nut assemblage 14 and extend between the inner and outer peripheries of such nut. The pins 28-42 are rotatable about their axes in the nut assemblage 14, and in accordance with the invention are carried by anti-friction bearing devices disposed between the roller elements and cooperable surfaces of the annular support member 14. The roller elements are thus mounted in the nut assemblage in a substantially radial disposition with respect to the annular configuration of the nut, and also disposed along helical lines conforming to the helix of the thread 12.

It will be understood that the thread 12 may be a single thread, or else a double thread (two threads extending in parallel relation, etc.)

In FIG. 5 a planar development of the inner periphery of the nut assemblage 14 is depicted, wherein a total of 8 roller elements is indicated. As shown, the roller elements may be staggered and provided in sets of four, or in other arrangements suited to the particular application, load-carrying capacity, etc.

Referring to FIG. 3, the roller element 28 is shown as carried by a radial-load roller bearing assemblage 48, by which it is turnable in the socket provided with a minimum amount of friction. Also, a thrust bearing assemblage 50 having rollers 51 is provided, for engagement with the outer end or head surface of the pin 28, thereby to take thrust forces on the pin with a minimum of friction. The thrust bearing 50 may be retained in place by a retainer sleeve 20 of the nut assemblage, or by any other suitable means. In place of the thrust bearing assemblage 50 shown in FIG. 3, an alternative thrust bearing assemblage comprising balls 52 in a cage 54 may be provided, for engagement with a pointed outer end portion 56 of a roller element or pin 58. Other types of anti-friction bearing devices may be provided, for mounting the load bearing pins 28–42, as will be understood. Those illustrated herein have been found to be especially advantageous for the purposes of the invention.

It will now be understood that the roller elements 30 are carried in the nut assemblage 14 so as to turn with a minimum amount of friction, that which does occur being mainly rolling friction involving the radial bearing assemblage 48 and the thrust bearing assemblage 50. The roller elements or pins 28–42 have a line contact with the side surfaces of the thread 12 and have a rolling type frictional engagement with such thread whereby there is reduced to the greatest possible extent frictional drag and inefficiency in the transmission of forces between the screw 10 and the nut assemblage 14.

In connection with the arrangement shown in FIGS. 4 and 5 it will be noted that eight of the roller elements are in engagement simultaneously with the thread 12, this being for a short length of the nut 14. For a longer length of nut, an additional set of four roller elements may be utilized, or multiple sets may be used. Depending on the nut length and the required load capacity, many additional sets of rollers may also be provided. The arrangement of FIGS. 4 and 5 depicts roller elements in two sets of four each. However, sets of five rollers, six rollers or seven rollers may similarly be utilized. Thus an appreciable increase in load capacity is possible by providing additional rollers in each set, and utilizing additional sets, the latter crcumstance requiring a greater length of nut.

Referring to FIG. 3, the small taper in the cross section of the thread 12, and the small taper on the roller element or pin 28 results in a relatively light axial thrust being experienced by the pin, thereby lightening the load on the thrust bearing assemblage 50. This is of considerable advantage, and enables the transmission to handle relatively heavy loads.

With the arrangement of FIGS. 4 and 5, where the screw 10 has for example an outside diameter of 2½ inches, a nut which is 8 inches long and having 64 roller elements will handle a load of approximately 50 tons. The included angle between opposite walls of the thread 12 may advantageously be in the neighborhood of 3½° without involving excessive stresses on the thrust bearings 50 at the outer ends of the roller elements 28–42.

In FIG. 7 there is also illustrated an adjusting screw 60 to effect radial adjustment of the roller element 58.

Thus by suitably adjusting each of the elements or pins 58 in a nut, equalization of the loads on the pins may be effected, preventinng any one pin or any group of pins from hogging the load and failing as a consequence.

FIG. 8 shows a adjustable transmission made in accordance with the invention. Parts similar to those already described have like characters. The pins 70 have grooves 72 accommodating split rings 74 which engage washers 76 in turn engaging the end thrust bearing assemblages 50. Adjusting screws 60a engage the bearing assemblages 52 and provide for axial adjustment of the pins 70.

It will now be understood that, in accordance with the invention and the foregoing, I have provided an improved light and heavy load transmission device having exceptionally low friction, and high efficiency, said transmission being relatively simple in construction and involving few components which are easily made. The transmission is small and compact, and may be economically fabricated. It especially fills the need for a device to efficiently handle loads greater than those which recirculating ball elements are capable of handling.

Variations and modifications may be made within the scope of the claims, and portions of the improvement may be used without others.

I claim:
1. An anti-friction transmission mechanism engageable and cooperable with projections of a shouldered part, comprising in combination:
   (a) a support member having an annular portion adapted to extend along the projections of said part in spaced relation thereto,
   (b) a plurality of roller elements carried by and projecting from the annular portion of the support member and arranged for engagement and line contact with side surfaces of the projections of said part,
   (c) anti-friction bearing devices disposed between said roller elements and annular portion of the support member, mounting the elements thereon in substantially radial disposition with respect to said annular portion,
   (d) the annular portion of the support member having sockets in which the roller elements and bearing devices are carried,
   (e) said roller elements comprising pins, and
   (f) the bearing devices comprising thrust bearing assemblages engaged with ends of the roller elements, and comprising separate radial bearing assemblages engaged with sides of the roller elements.

2. The invention as in claim 1, wherein:
   (a) means are provided for effecting radial adjustment of the roller elements.

3. An anti-friction transmission mechanism engageable and cooperable with projections of a shoulder part, comprising in combination:
   (a) a support member having an annular portion adapted to extend along the projections of said part in spaced relation thereto,
   (b) a plurality of roller elements carried by and projecting from the annular portion of the support member and arranged for engagement and line contact with side surfaces of the projections of said part,
   (c) anti-friction bearing devices disposed between said roller elements and annular portion of the support member, mounting the elements thereon in substantially radial disposition with respect to said annular portion,
   (d) the support member comprising an annulus,
   (e) said annular portion of the support member comprising the inside of said annulus,
   (f) said roller elements projecting inward from said annular portion,
   (g) said annulus being constituted of a plurality of segments, and
   (h) means provided, securing the segments in assembled relation.

4. The invention as in claim 3, wherein:
   (a) the annulus has substantially radially disposed sockets extending between its inner and outer peripheries,
   (b) said roller elements comprising headed pins carried in the sockets and extending inward past the inner periphery of the annulus with the head portions located at the outer periphery of the annulus,
   (c) said head portions preventing inward movement of the pins from the sockets, and
   (d) means engaging the head portions of the pins and including a sleeve on the outer periphery of the annulus, blocking the pins against outward movement whereby they are retained in the said sockets.

5. An anti-friction transmission mechanism engageable and cooperable with projections of a shouldered part, comprising in combination:
  (a) a support member having an annular portion adapted to extend along the projections of said part in spaced relation thereto,
  (b) a plurality of roller elements carried by and projecting from the annular portion of the support member and arranged for engagement and line contact with side surfaces of the projections of said part,
  (c) anti-friction bearing devices disposed between said roller elements and annular portion of the support member, mounting the elements thereon in substantially radial disposition with respect to said annular portion, and
  (d) means provided for effecting radial adjustment of the roller elements.

6. The invention as in claim 5, wherein:
  (a) the annular portion of the support member has sockets in which the roller elements and bearing devices are carried,
  (b) means comprising screws threaded into said sockets, are provided for effecting radial adjustment of the roller elements.

References Cited by the Examiner

UNITED STATES PATENTS

| | | | |
|---|---|---|---|
| 1,899,663 | 2/1933 | Bishop | 74—458 |
| 3,169,407 | 2/1966 | Newell | 74—424.8 |

FOREIGN PATENTS

| | | |
|---|---|---|
| 304,541 | 1/1929 | Great Britain. |
| 636,826 | 5/1950 | Great Britain. |

DAVID J. WILLIAMOWSKY, *Primary Examiner.*

L. H. GERIN, *Assistant Examiner.*